Nov. 20, 1923.                                                         1,474,990
W. WRIGHT
COMBINED TYPEWRITING AND COMPUTING MACHINE
Filed Sept. 30, 1911          5 Sheets-Sheet 1
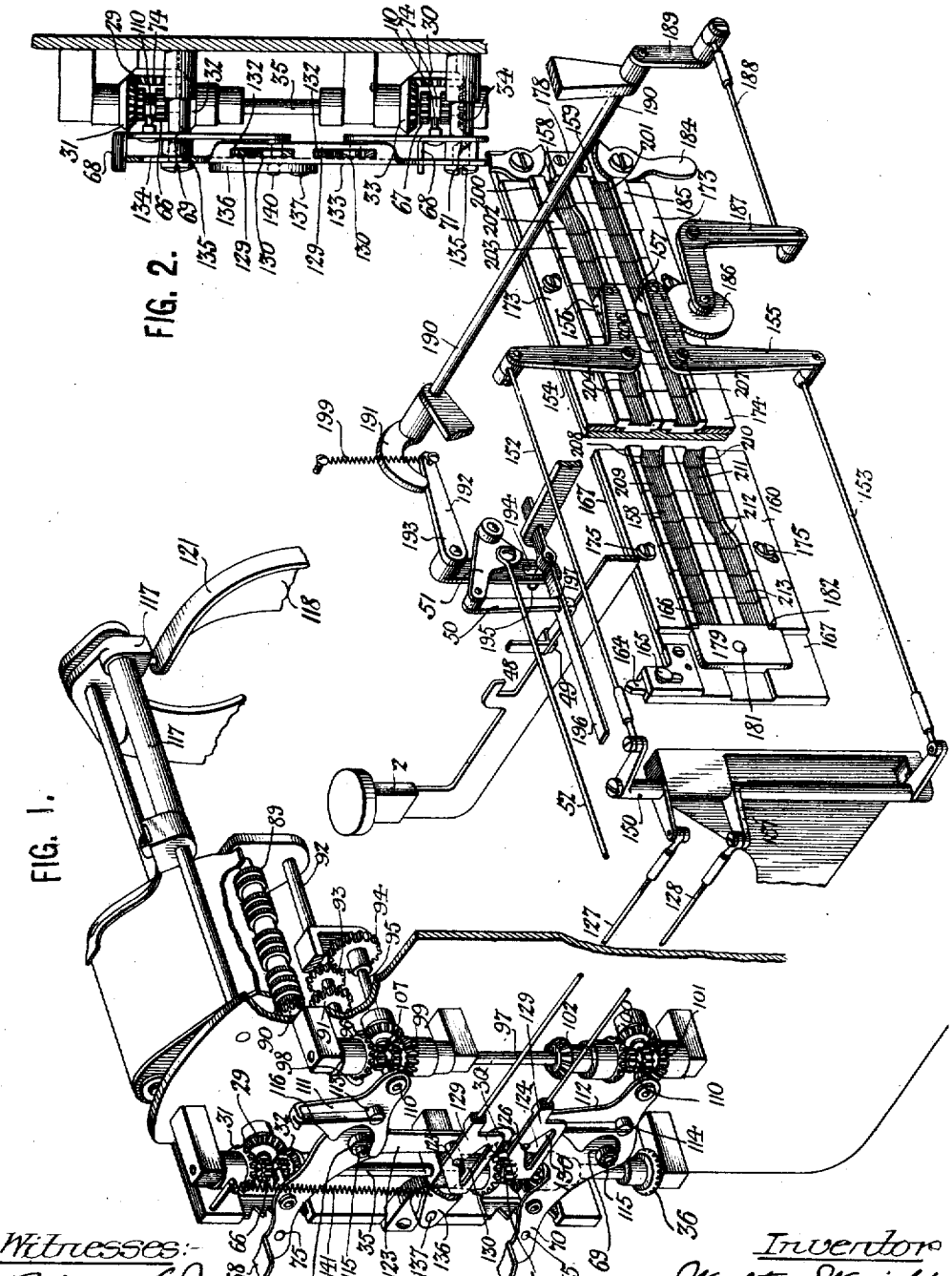

Nov. 20, 1923.  1,474,990
W. WRIGHT
COMBINED TYPEWRITING AND COMPUTING MACHINE
Filed Sept. 30, 1911    5 Sheets-Sheet 2
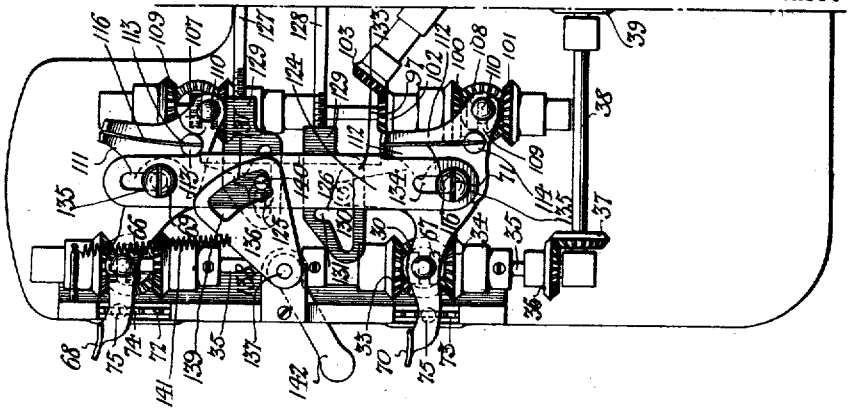
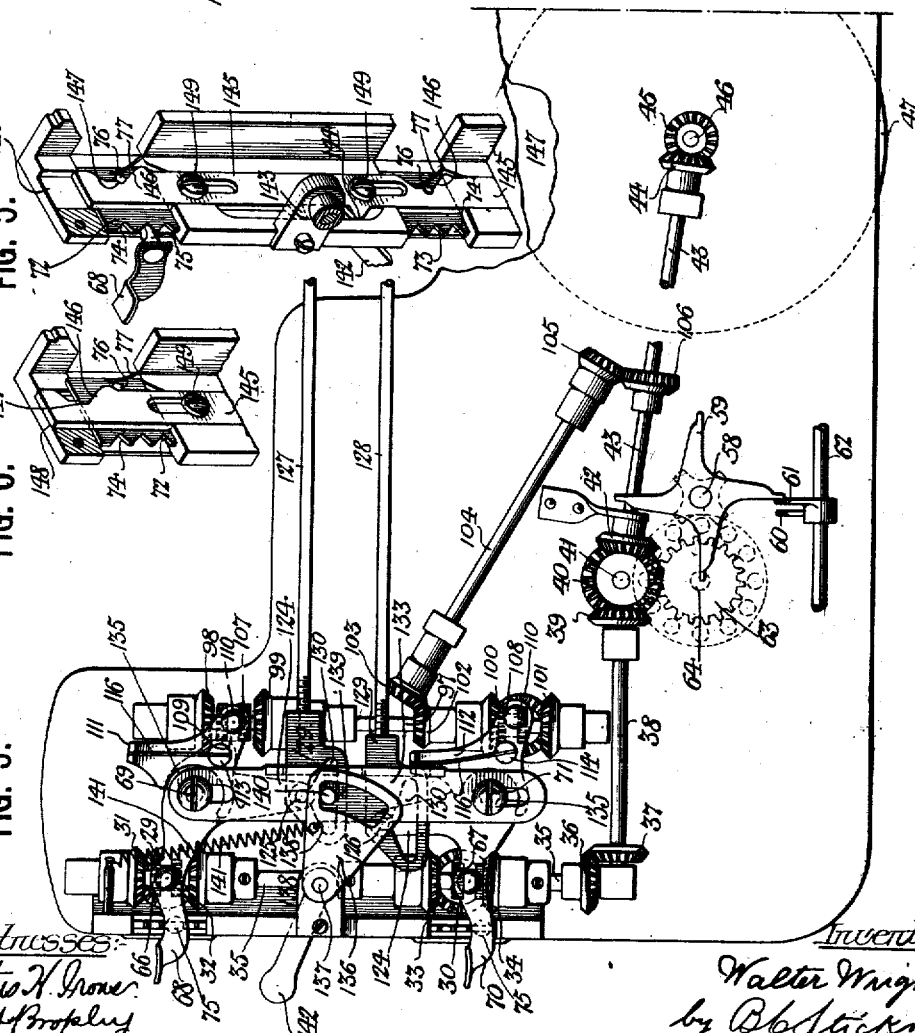

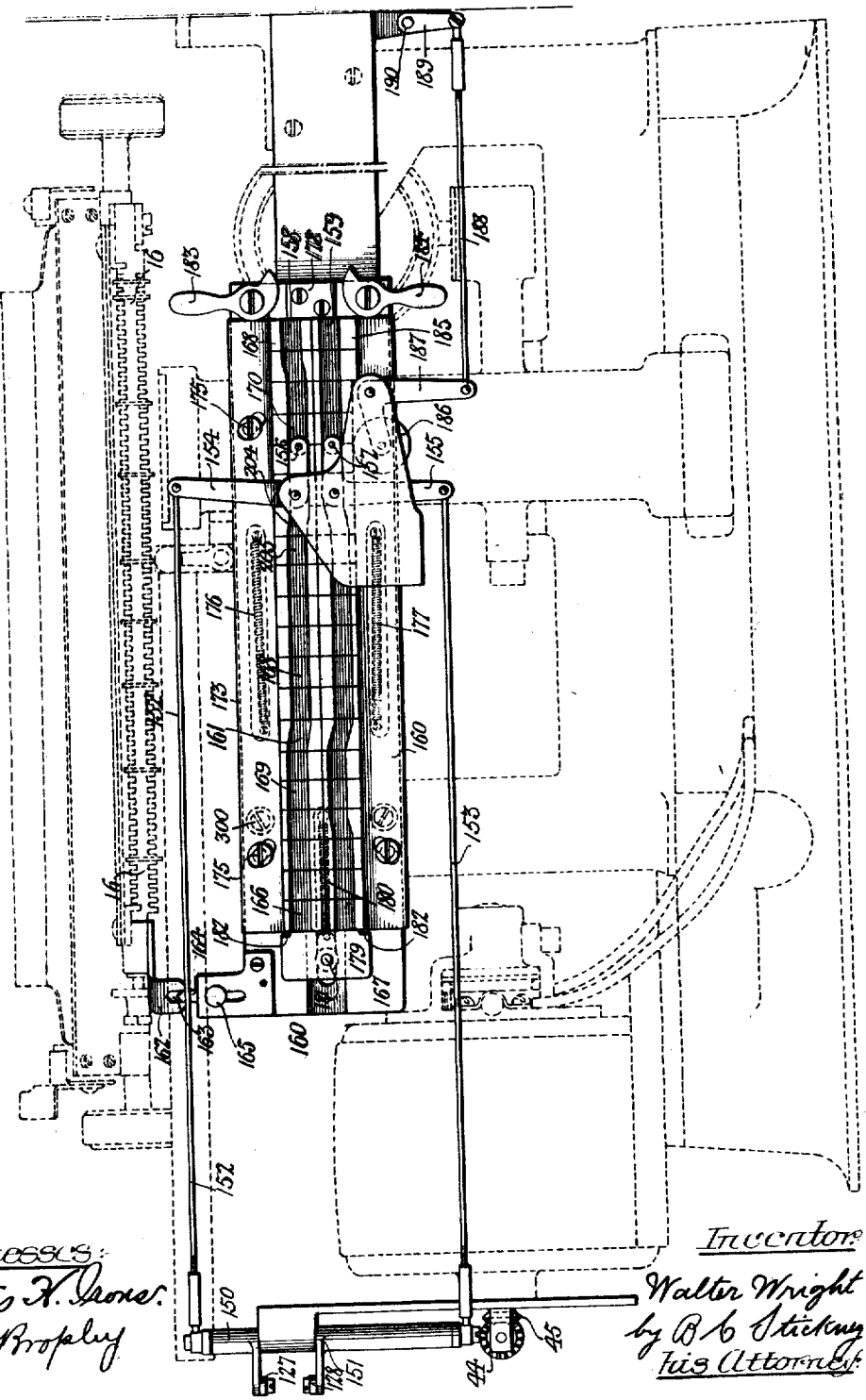

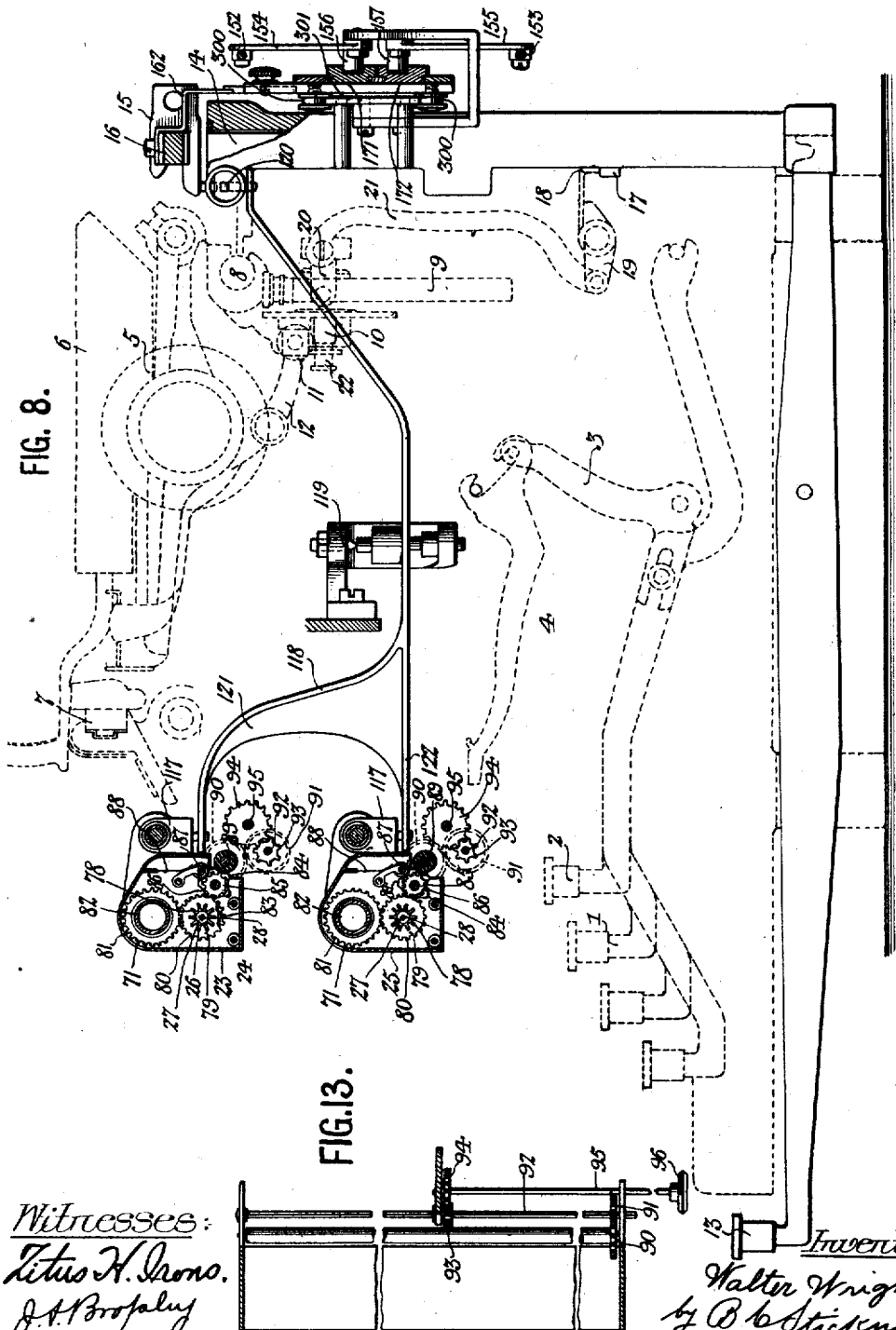

Nov. 20, 1923.
W. WRIGHT
1,474,990
COMBINED TYPEWRITING AND COMPUTING MACHINE
Filed Sept. 30, 1911  5 Sheets—Sheet 5
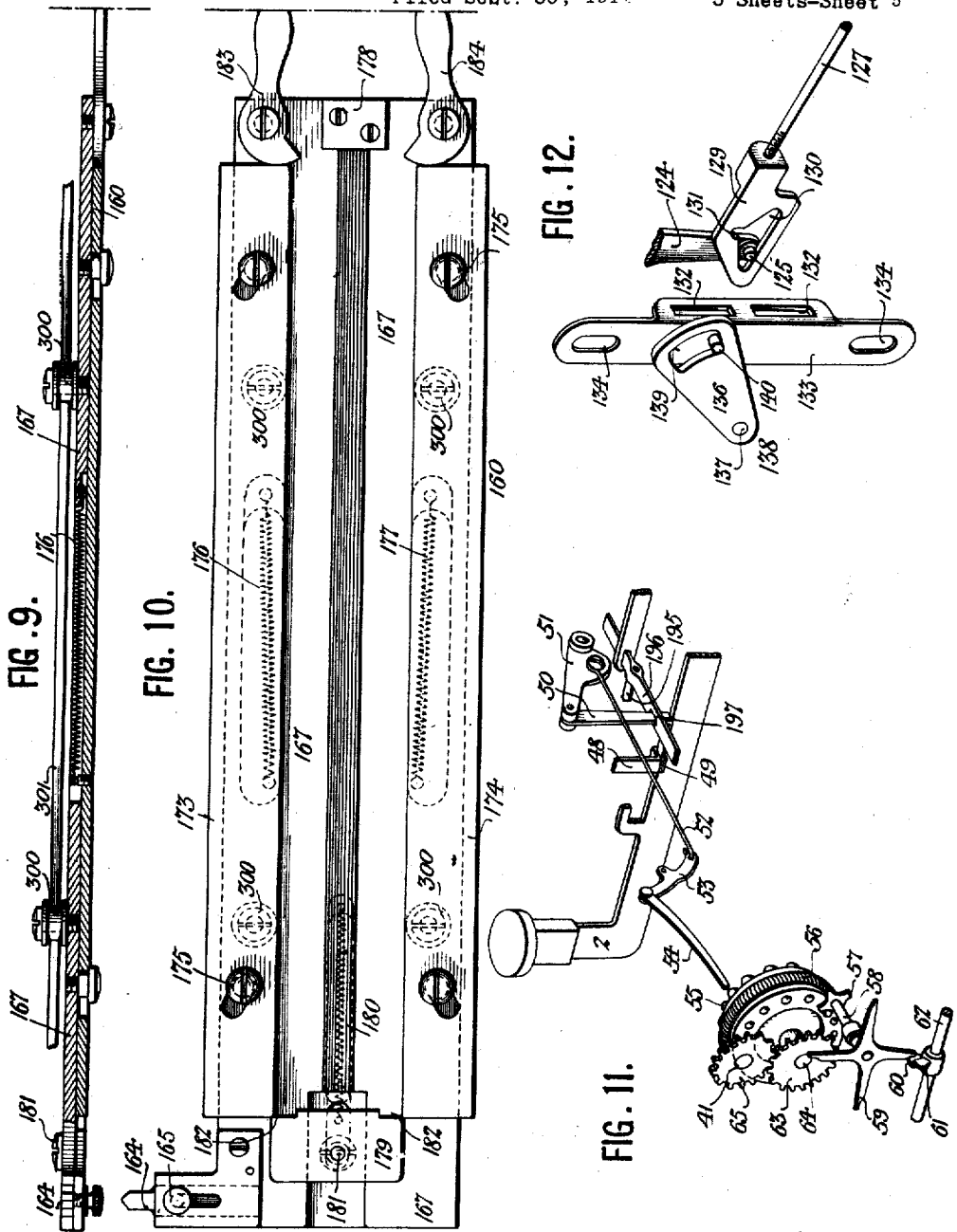

Patented Nov. 20, 1923.

1,474,990

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed September 30, 1911. Serial No. 652,153.

*To all whom it may concern:*

Be it known that I, WALTER WRIGHT, a citizen of the United States, residing in New York city, in the county of New York and State of New York, have invented certain new and useful Improvements in Combined Typewriting and Computing Machines, of which the following is a specification.

This invention relates to a combined typewriting and computing machine, and more especially to the automatic controlling of the change between the several states of adding, neutral and subtraction.

In prior applications as for example in application of Wright and Degener No. 543,603, filed February 12, 1910, (now Patent No. 1,237,008, dated August 14, 1917) provision has been made for the changing from adding and neutral to subtracting by a manual manipulation of certain control levers. This manual shifting is very good where the changes are unfrequent, but in some classes of work where there are several changes, even in a single line, the manual shifting becomes laborious and is especially so where more than one computing head is used. Besides, there is the ever present possibility of an error being made where a human element is depended upon to accomplish the frequent changes.

It is therefore an object of this invention to automatically control the changes of the computing mechanism, embodying one or more computing heads, from one to the other of the several states of adding, neutral and subtracting.

In the embodiment used to illustrate this invention, a plurality of computing heads are shown of a type in which a master wheel is given a certain rotation at the striking of each numeral key, the extent of which corresponds to the particular numeral key. This master wheel may be fed step-by-step concomitantly with the travel of the carriage, so as to be brought successively in co-operation with each of a series of gears controlling corresponding computing wheels. The change from adding to subtracting, and through the intermediate neutral state, may be obtained by reversing the direction of rotation of the master wheel by means of a shiftable clutch adapted to operatively connect the main drive in driving relation with said master wheel through two different sets of gearing which tend to rotate the master wheel in opposite directions.

In this invention, the shifting of the above-mentioned clutches for controlling the direction of rotation and the rotation of the master wheel may be accomplished automatically by the provision of a cam carried by the carriage embodying a plurality of cam tracks, one for each of the computing heads, which has the different sections of the track arranged so as to shift the clutches back and forth through the intermediary of linkages.

Another object of this invention is to permit the change from automatic to manual control, and vice versa, and actuate the parts so that the elements of the one will not interfere with the elements of the other when one is active and the other is dormant. That is to say, if it is desired to run the machine without the automatic control, this automatic control can be disconnected, and likewise if it is desired to run the machine under automatic control, the automatic control can be brought into operation.

To attain this object, there may be provided a single lever, which shifts concomitantly all of the linkages connecting the cam tracks with the shiftable clutches, so as to render said linkages inoperative for the purpose of actuating said clutches from said automatic control. This action renders inoperative at the same time, the locks provided for each of the manual shift levers, so that they will not interfere with the operation of the automatic device.

A further object of this invention is to automatically disconnect the computing mechanism so as to render the same inoperative when it is desired to use the typewriting mechanism without the computing mechanism. This may be accomplished by the provision of one or more cam lugs on the cam control, which engage mechanism adapted to disconnect the numeral keys from the computing control mechanism, so that when a numeral key is struck after the disconnecting mechanism has operated, the computing mechanism will not be operated.

A still further object of this invention is to provide a control of a composite nature with the elements thereof interchangeable so as to produce any desired sequence of operation as to adding, subtracting and neutral. This end may be reached by dividing the cam tracks into a plurality of sections and having them detachable from the body of the cam and so arranged that they can be shifted from one position to another, and in fact reversed if desired.

A still further object of this invention is to permit the typewriting and computing mechanism to run independent of automatic control. This end may be accomplished by providing means for detachably connecting the control embodying the cam from the carriage, so that it will remain stationary and thereby be inactive.

Other features and advantages will hereinafter appear.

Referring to the drawings,

Figure 1 is a fragmentary perspective view.

Figure 2 is a fragmentary section taken from front to rear.

Figure 3 is a fragmentary end view in side elevation, showing the automatic control in operation.

Figure 4 is a fragmentary view similar to Figure 3, showing the automatic control thrown out of operation.

Figure 5 is a fragmentary perspective view, showing the locks for the manual shifting levers in their operative position.

Figure 6 is a fragmentary view similar to Figure 5, showing one of the locks for the shifting levers in its inoperative position.

Figure 7 is a rear view in elevation.

Figure 8 is a fragmentary vertical section taken from front to rear.

Figure 9 is a horizontal longitudinal section through the control with the cam sections removed.

Figure 10 is a rear view in elevation of the control, showing the same open and with the cam sections removed.

Figure 11 is a fragmentary perspective view, showing a detail of the means for controlling the rotation of the master wheel from the numeral key.

Figure 12 is a detail perspective view with the parts detached from each other, showing the connection of one of the links with the shifter therefor.

Figure 13 is a detail view of one of the tens-carrying wheels for one of the computing heads.

Referring more particularly to the separate parts of this invention as embodied in the form shown in the drawings, and as illustrated in connection with an Underwood combined computing and typewriting machine, 1 and 2 indicate respectively the character and numeral keys which actuate through the intermediary of bell crank levers 3 type bars 4, so that the latter will strike rearwardly against the front side of a platen 5 mounted on a carriage 6 in the usual manner. The carriage 6 is mounted so as to travel as usual on tracks 7 and 8. The motion of the carriage is attained in one direction by a spring barrel 9 controlled by a pinion 10 with which meshes a rack 11 supported by pivotally mounted arms 12 on the carriage 6. The escapement mechanism for the pinion 10, which is actuated at the striking of each key to permit the step-by-step movement of the carriage 6, is not shown.

In addition to the step-by-step movement, the carriage may be given a jump movement for the purpose of tabulating by striking one of a series of tabulating keys 13. These keys raise bars 14, which are adapted to engage with stops 15 on a rack bar 16, the latter being connected to the carriage so as to move therewith. Each of the bars 14 may be provided with an extension 17 which engages a universal bar 18 on a lever 19. The latter is connected to a lever 20 through the intermediary of a link 21. On the opposite end of the lever 20 there is provided a roller 22 which underlies the rack 11, and is adapted to lift the same from engagement with pinion 10 when one of the tabulating keys 13 is struck.

For the purpose of computing, there are provided one or more computing heads 23, of which two are shown indicated at 24 and 25, which, for the purpose of distinction, may be termed the "upper" and "lower" computing heads. While these computing heads are of any suitable character, they are shown in this case to be of that type shown in application No. 543,603, in which a master wheel 26 is given a certain rotation at the striking of each numeral key, the extent of which depends upon the particular numeral key struck. This master wheel is mounted on an arbor 27 which slides on a square shaft 28, so as to be connected thereto and yet permitted to move longitudinally relative thereto.

The shaft 28 is provided in the case of the upper adding head with a bevel pinion 29, and the lower adding head with a bevel pinion 30. The pinions 29 and 30 mesh each with a pair of bevel pinions 31 and 32 and 33 and 34, which it will be seen are arranged to rotate the pinions 29 and 30 in opposite directions. The pinions 31, 32, 33 and 34 are loosely mounted on a shaft 35 which is provided at one end with a bevel gear 36 meshing with a corresponding gear 37 on a shaft 38. The opposite end of the shaft 38 is provided with a bevel gear 39 which meshes with a bevel gear 40 on a shaft 41. The gear 40, and thus the shaft 41, is adapted to be rotated through the intermediary of a bevel gear 42, a shaft 43 and bevel gears 44 and 45, by a motor shaft 46 driven by the motor 47.

The rotation of the shaft 41 however is prevented until one of the numeral keys is struck. If reference is had to Figures 1 and 11, it will be seen that on each of the numeral keys 2 there are provided a pair of jaws 48 and 49, between which extends a hook link 50 in such a manner that it can be moved from between the jaws 48 and 49 by passing out through the opening at one side thereof.

Each of the hook links 50 is connected at its opposite end to a bell crank lever 51, which is connected through the intermediary of a link 52 with a lever 53. The latter is provided with a jack 54 in each instance, which is located opposite one of a series of pins 55 provided in a primary escapement wheel 56. When one of these pins is projected by one of the jacks 54, it will extend from the opposite side of the escapement wheel 56 so as to be stopped by a rotary toothed dog 57 mounted on a shaft 58 which is also provided with a secondary escapement wheel 59, the teeth of which are adapted to be obstructed in their movement by a pair of detents 60 and 61 provided on a shaft 62.

This mechanism, which is more fully described in application No. 543,603, acts so that when a numeral key is struck one of the jacks will project the corresponding pin so that when the detents 60 and 61 release the escapement wheel 59, the escapement wheel 56 will be permitted to rotate a certain amount dependent upon the particular numeral key struck, because of the variable distances between the several pins 55 and the rotary dog 57.

The escapement wheel 56, when thus permitted to rotate, rotates a gear 63 a corresponding amount, through the intermediary of a shaft 64 to which they are secured. This gear 63 meshes with a corresponding gear 65 on the shaft 41.

It will thus be seen, as further described in application No. 543,603, that the shaft 35 on which the gears 31 to 34 are loosely mounted is given a certain rotation dependent on the particular numeral key struck.

For the purpose of connecting the gears 31 to 34 to the shaft 35, so that they will be driven by the latter, there are provided clutches 66 and 67 splined on the shaft 35 and adapted to be shifted into engagement with corresponding clutches on the opposed faces of the gears 31 to 34. The clutch 66 may be shifted from one position to another by means of a shifter lever 68 pivoted at 69, and in the same manner the clutch 67 may be shifted by a shifter lever 70 pivoted at 71. Each of these clutches is provided with a circular groove into which a tongue on each of the shifter levers 68 and 70 extend. When the shifter levers 68 and 70 are moved to their uppermost positions the gears 31 and 33 will be connected in driving relation to the shaft 35, and will thus drive the gears 29 and 30 in one direction. When the shifter levers 68 and 70 are shifted to their lowermost positions, the gears 32 and 34 will be connected in driving relation to the shaft 35, so that the gears 29 and 30, and thus the master wheels operated thereby, will be driven in the opposite direction. When the shifter levers occupy an intermediate position, the clutches 66 and 67 will not be in connection with either of the members of each pair, so that the shaft 35 will not drive any of the gears 31 to 34.

Of course it is to be understood that the shifter levers 68 and 70 can be operated independently so that the master wheels can be rotated in the same direction, or in opposite direction, or one be rotating and the other remain passive. For the purpose of locking the shifter levers 68 and 70 in each of their positions of adjustment, there are provided, as will be seen by reference to Figures 5 and 6, detent or lock plates 72 and 73, having on their exposed edges three serrated notches 74, into which pins 75 on the shifter levers 68 and 70 can slip, so as to hold the shifter levers secure in any position of adjustment. The detent plates 72 and 73 are provided each with a pin 76 engaged by a spring 77, which urges each of the detent plates forward to its locking position.

As has been stated above, the master wheels 26 are slidingly mounted on the shafts 28, the purpose of which is to bring the teeth thereof successively into engagement with internal teeth 78 provided on gears 79. These gears 79 are arranged in a series side by side, and are provided with external teeth 80 to form external gears to mesh with gears 71, carrying numeral or computing wheels 82. This provides for the individual rotation of the separate gears 79, and it is necessary to carry the rotation of one gear to the next adjacent gear when each gear has made a complete rotation for the purpose of carrying the units to tens and the tens to hundred and so on. Any simple mechanism may be used for this purpose.

In this case, as shown in that illustrated in application No. 543,603, each of the gears 79 is provided with a special tooth 83 which is adapted to engage once in a complete rotation, a five-toothed pinion 84, which is provided with a gear 85 meshing with the teeth of the next highest gear 79. The pinion 84 is separated from the gear 85 by an intermediate 86 to which they are both secured, which is provided with sockets to which a detent roller 87 is adapted to act under the pressure of a spring 88, to lock the members against accidental movement. The teeth on this wheel 86 are so arranged that when the wheel 86 begins to turn a constantly rotating rubber roller 89 will engage said teeth and complete its turning, said roller 89 being driven by a gear 90 meshing with a gear 91 on a shaft 92.

The shaft 92 is provided with a gear 93 meshing with a gear 94 on a shaft 95, the latter having a bevel gear 96 on one end, which, in the case of each adding head, is located opposite one of the pairs of bevel gears 98, 99, and 100, 101 loosely mounted on the shaft 97. The shaft 97 is given a constant rotation when the computing mechanism is in operation by a bevel gear 102 secured thereto, which meshes with a bevel gear 103 on a shaft 104, the latter being provided also with a bevel gear 105 meshing with a gear 106 on the shaft 43, which, as has been previously described, is driven by the motor 47.

In the gears 98 to 101 is also provided a means for shifting the direction of rotation of the tens-carrying mechanism by changing the direction of rotation of the continuously rotating rubber rollers 89. For connecting the pairs of gears 98 and 99, there is provided a shiftable clutch 107 splined on the shaft 97, and for connecting the gears 100 and 101, there is provided a shiftable clutch 108 also splined on the shaft 97. These clutches 107 and 108 are provided with the usual groove 109 into which extend pins 110 on levers 111 and 112, the former being pivotally mounted on a pin 113 secured on the shifter lever 68, and the latter being pivotally mounted on a pin 114 secured on the shifter lever 70. Springs 116 urge the levers 111, 112 to move with their shifter levers and each of these shifter levers is provided with a boss 115 which engages between fingers provided on the levers 111 and 112 in such a manner as to permit a limited relative motion or play, and yet so that they will cause the shifter levers 68 and 70 to operate the levers 111 and 112 if the parts are so jammed that the springs 116 are too weak to release the parts.

It will thus be seen that when either of the shifter levers 68 or 70 are manipulated to change to any of the three positions of adding, subtracting or neutral, that the driving mechanism for the tens carrying mechanism will be simultaneously reversed or made stationary to correspond to the direction of rotation of the master wheels.

Each of the arbors 27 is provided with a movable frame 117, whereby it may be shifted through the series of gears 79 of each of the computing heads 24 and 25 for the purpose of successively bringing the master wheels in co-operation with each of the gears 79 as the carriage is moved step-by-step in the striking of successive figures.

The frames 117 carrying the arbors with the master wheels may be manipulated from the carriage in any suitable manner, such as that described in my application No. 574,813, filed August 1, 1910, (now Patent No. 1,244,398, dated October 23, 1917), wherein a lever 118 is pivotally mounted intermediate its ends at 119 and is adapted to be intermittently connected through the intermediary of a catch 120 and the stops 15 with the carriage 6. This lever 118 is provided at its opposite end with forks 121 and 122, whereby the frames 117 of the computing heads 24 and 25 may be moved by the lever 118.

As has been stated above, if frequent changes from adding to subtracting are made, especially in a single line, it is desirable that the shifting mechanism shall be controlled automatically so as to relieve the operator of the work incident to the changing, and also so as to eliminate danger of making mistakes. For this purpose, the shifter 68 is provided with an extension arm 123, and the shifter 70 is provided with an extension arm 124, which arms are provided respectively with pins 125 and 126 adapted to connect the shifters 68 and 70 with links 127 and 128. The links 127 and 128 extend to the control mechanism to be described presently, but connection of these links with the pins 125 and 126 is preferably such that the links can be connected or disconnected at the will of the operator, so as to make the control operative or inoperative. For this purpose, the ends of the links 127 and 128, which cooperate with the pins 125 and 126, are provided with connecting plates 129 in which are located somewhat triangular slots 130.

The upper apex of each of these triangular slots is provided with a socket 131, as seen more clearly by reference to Figure 12. It will be seen that when the pins 125 and 126 rest in these sockets 131 that the motion of the extension links 127 and 128 will be transmitted through the plates 129 to the extensions arms 123 and 124.

It will be further seen that when the elongated base portion of the slots 131 is located in register with the pins 125 and 126, that the links 127 and 128 will be free to oscillate without actuating the extension arms 123 and 124. In order to obtain the different positions of adjustment of the plates 129 and the links connected thereto relative to the pins 125 and 126, the plates 129 extend through suitable slots 132 is a sliding bracket 133. The sliding bracket is shown to be provided with slots 134 which are engaged by screw pins 135 so as to permit the sliding movement of the bracket 133 and yet confine its motion. The bracket 133 may be manipulated by a lever 136 which is pivoted at 137, and is provided with a sector arm 138 on one side of this pivot 137 in which arm is located a slot 139 through which extends a pin 140 provided on the bracket 133. This gives a limited relative motion of the lever 136 with respect to the bracket 133, and yet permits the lever to actuate the bracket so as to shift it to either of its adjusted positions. This mechanism may be termed a "shifter" for changing the position of the connecting links 127 and 128 so as to connect and disconnect them operatively to the shifter levers 68 and 70. A spring 141 is connected to the lever 136 tending normally to raise the sector end thereof to its highest position.

Inasmuch as the lowering of the bracket 133 connects the shifters 68 and 70 to the control to be described, it is desirable that the locking plates 72 and 73 be operatively disconnected from these shifters 68 and 70, so that they will not interfere with the action of the control. For this purpose, the other arm of the lever 136 indicated at 142, extends between lugs 143 and 144 of a slide 145, so that when the lever 136 is actuated, this slide 145 will also be actuated.

At the top and bottom of the slide 145 there are provided cam portions 146 which are adapted to force the pins 76 backwardly against the tension of the springs 77 so as to remove the serrated front portions of the detent plates 72 and 73 from co-operation with the pins 74 on the shifter levers 68 and 70. It will be noted that the cams 146 project a sufficient distance beyond the rear edge of the sliding plate 145 so as to lock the pins 76 in the position indicated in Figure 6. Likewise, the foot of each cam 146 is cut a sufficient distance to form a socket, as at 147, so as to permit the pins 76 to be locked in the forward position of the detent plates 72 and 73, as indicated in Figure 5.

Inasmuch as the slide plate 145 is thus itself locked by the pins 76 in either position of adjustment, the lever 136 will be likewise locked. Of course the lock is only positive enough to prevent accidental disengagement, and a forced disengagement of the lever 136 will readily disengage the pins 76 from the slide plate 145. Any means may be provided for permitting the sliding of the plate 145, and in this instance, the plate is shown to be guided in a groove 148, and to be further confined and limited in its motion by one or more pin-and-slot connections 149.

Having thus described the means for connecting the links to the shifting levers which control the adding and subtracting, we now come to the automatic control which operates the links. As will be seen by reference to Figure 1, the links 127 and 128 are connected to bell crank levers 150 and 151 which are in turn connected by means of links 152 and 153 to followers 154 and 155, which are shown in the form of pivotally mounted bell crank levers having rollers 156 and 157 adapted to follow cam tracks 158 and 159 provided in a control 160, which is slidingly mounted by means of channeled rollers 300 which engage a track plate 301 supported on any suitable fixed portion of the frame of the machine.

It will be seen that each of the cam tracks 158 and 159 has runs of three different elevations connected by switch portions 161 to change from one elevation to the other. That is to say, each of the cam tracks is capable of manipulating each of the followers 154 and 155 to three different positions corresponding to adding, neutral and subtracting. That is to say, the lower elevation of each of the cam tracks corresponds to the adding position of the shifter levers 68 and 70, the intermediate elevation corresponds to the neutral position of the shift lever, and the upper elevation corresponds to the subtracting position of the shift lever. Inasmuch as the extension arms 123 and 124 of the shifter levers 68 and 70 extend in opposite directions, the followers 154 and 155 must also extend in opposite directions to obtain this agreement between the cam tracks 158 and 159.

The control 160 moves relative to the followers 154 and 155, so that these followers are oscillated back and forth according to the cam tracks 158 and 159. The movement of the control 160 may be obtained from any suitable movable portion of the computing and typewriting machine, and in this instance is shown as being connected to the carriage 6. For this purpose the rack 16 is shown as being provided with a bracket 162 having a slot 163, whereby it forms a catch adapted to be engaged by a latch 164. The latch 164 is slidingly mounted on the control 160 and movable by a button 165, so as to connect or disconnect the control 160 to the carriage at will.

While the control 160 might be unchangeable with the different portions of the cam tracks integral with each other so that a separate control would have to be used with each character of work, it is desirable that said control should be of a composite nature and that the sections thereof should be interchangeable, so that any sequence of operations may be obtained by the mere resetting of the control. For this purpose, the cam tracks 158 and 159 are composed of a series of individual sections 166 which are disconnectible from the body portion of the control, which in this instance may be represented by a back plate 167. It will be seen that there are several types of sections 166, in one of which the groove or track portion is located intermediate the top and bottom edges of the section which will correspond to an intermediate position of the follower, determining a neutral state of the adding head in which the adding head is neither adding nor subtracting. Such a section is indicated at 168 in Figure 7.

Another type of section is where the cam track is located nearer the top than the bottom of the section corresponding to the subtracting position of the follower and the mechanism connected thereto. Such a section is indicated at 169 in Figure 7.

The sections are preferably so made that the sections 169 can be shifted from the upper cam track 158 to the lower cam track 159, or so that they can be reversed to form sections 170 in which the cam track is located near the lower margin of the section than the upper, corresponding to the adding position of the follower and the mechanism connected thereto.

In order to obtain this interchangeable and reversible feature of the sections, the back end of each section is rabbeted in a beveled manner at the top and bottom edges, as seen more clearly by reference to Figures 1 and 8, so as to form dove-tailed connections with ways 171 and 172, one of which is provided for each of the cam tracks desired. The inner side of the ways 171 and 172 may be made stationary in the form of a fixed rail, while the other sides are shown to be movable so as to form clamping rails 173 and 174. These clamping rails are slidingly mounted on the back plate 167 and connected thereto in any suitable manner by one or more pin-and-slot connections indicated at 175. The clamping rails 173 and 174 are held in their clamping position by springs 176 and 177 which are connected at one end to the rails, and at their other ends to the back plate 167. A fixed chock 178 is located at one end of the control 160 to prevent movement of the sections in one direction, and a movable chock 179 is provided at the opposite end of the control to prevent movement of the sections in the opposite direction.

The chock 179 is preferably slidingly connected to the back plate 167 and normally held in its clamping position by means of a spring 180. The limits of movement of the movable chock 179 are determined by a pin-and-slot connection 181 so that when the chock 179 engages the end section 166, it will be out of contact with the locking rails 173 and 174, as indicated in Figure 7, so that the full force of the spring 180 will be effective for the purpose of securing the sections 166 in position; the side edges of the chock 179 being rabbeted at 182 to permit the chock 179 to engage the sections 166 without engaging the ends of the rails 173 and 174. The rails 173 and 174, however, when themselves manipulated to pass out of contact with the sections 166, are adapted to simultaneously force the chock 179 out of engagement with the end sections 166, as will be seen by reference to Figure 10, where the rails and the chock 179 are shown in their expanded positions.

In order to obtain this manipulation of the rails 173 and 174 and the chock 179, there are provided actuators 183 and 184, shown in the form of cam levers pivotally mounted on the back plate 167 and adapted to engage the ends of the rails 173 and 174. To release the sections, the cam levers are manipulated from the position indicated in Figure 1 to the position indicated in Figure 10 whereby the rails are forced from the position indicated in Figure 1 to the position indicated in Figure 10 against the tension of the springs 176, 177.

It is desirable to disconnect the computing mechanism from the typewriting mechanism at such times as may be necessary to use the typewriting mechanism without the actuation of the computing mechanism. For this purpose, the control is provided with one or more projecting lugs 185, which in this case is shown to be formed on one of the end sections. This projecting lug 185 acts as a cam to manipulate through the intermediary of a roller 186 a bell crank lever 187 which is connected by a link 188 to an arm 189 on a shaft 190. The opposite end of the shaft 190 extends to the front of the machine where it is provided with an arm 191 which slidingly abuts against an arm 192 on a bell crank lever 193. The other arm of this bell crank lever 193 is provided with a slot 194 in which engages a pin 195 secured to a shift bar 196. This shift bar is provided with a plurality of slots 198 through which extend the hook links 50 which connect each of the numeral keys 2 with the escapement mechanism, whereby the extent of movement of the computing mechanism is determined. It will thus be seen that when the bell crank lever 187 is manipulated by the cam lug 185 provided at the end of the control 160, that the shift bar 196 will be manipulated so as to disconnect each of the hook links 50 from the numeral keys 2, so that the actuating and controlling mechanism for the computing heads will be rendered inactive. After the control 160 has been shifted to a position such as to permit the roller 186 to return to its normal position, the shift bar 196 will be returned to a position connecting the links 50 to the numeral keys 2 by a spring 199 which returns the bell crank lever 193 to its normal position. Thus the spring 199 normally locks the keys to the computing device, but the bar 196 can be moved to disconnect said keys from said device independently of the position of the control 160. It will be noted that from some points of view the control 160 may be regarded as a computing machine carriage.

Considering the operation of the device, it will be seen that as each numeral key is struck it will permit the rotation of each master wheel 26 an amount depending on the particular numeral key struck, which extent of rotation is determined by the particular pin 55 actuated by one of the jacks 54. This of course occurs only in the adding head which is either adding or subtracting, that is to say, in which the shifter levers 68 and 70 are thrown over to their uppermost or lowermost position. If either of the shifter levers 68 and 70 is in an intermediate or neutral position, the corresponding computing head will not be actuated inasmuch as the master wheel will not be connected up in driving relation with the motor 47 and the control mechanism located intermediate the motor 47 and the shaft 35.

As each key is struck the carriage 6 will be fed step-by-step so that the number will be imprinted on the paper carried by the platen 5 on the carriage. The carriage 6 will transmit this movement step-by-step through the intermediary of the stops 15, the latch 120 and the lever 118, to each of the master wheels, so as to bring it successively into co-operation with each of the gears 89 whereby the several computing wheels 82 may be actuated successively.

If we assume that it is desired to repeat a definite sequence of operations which embody the shifting to adding, to subtracting and to neutral of the one or more adding heads, the control 160 may be set to relieve the operator of the manual manipulation of the shifter levers 68 and 70. The following example of a checking account is given which is adapted to be carried on by the particular control shown in the drawings.

We will assume that a man has a checking account and desires to keep track of his daily balances by merely striking them off on the typewriter, having the computing mechanism governed by the control 160 automatically take care of the adding, subtracting and neutral states of the two computing heads, in order to add the amount deposited to the balance of the day before, and add the several amounts checked out, and concomitantly subtract the total amount checked out from the total of the balance of the day before, plus the amount deposited so as to give the balance to be carried forward to the next day. The example is as follows:

| Day. | Balance carried forward | Amount deposited. | Checked out. | Checked out. | Checked out. | Total checked out. | Balance. |
|---|---|---|---|---|---|---|---|
| June 1 | 8,074.11 | 12,345.67 | 5,678.99 | 234.56 | 123.45 | 6,037.00 | 14,382.78 |
| June 2 | 14,382.78 | 5,678.92 | 7,654.56 | 123.55 | 765.88 | 8,543.99 | 11,617.71 |

It will be seen by following the action of the cam control in the travel of the carriage in a letter feeding direction, that the rollers 156 and 157 of the cam followers 154 and 155 start in the sections 200 and 201 which are neutral sections, so that the day June 1st, etc., can be written while both of the computing heads are disconnected from the actuating mechanism. It will also be noted that at this point the cam lugs 185 are in connection with the roller 186, so that all of the numeral keys 2 are disconnected from the controlling mechanism for the computing mechanism by the hooks 50 being disengaged from the jaws 48 and 49. For the first column of numerals designated as the "Balance carried forward" column, the upper roller of the upper follower 154 will be depressed by a switch section 202 into an adding section 203, while the roller of the follower 155 controlling the lower computing head will still remain in a neutral section, forming a continuation of the neutral section 201.

For the column designated as the "Balance carried forward" column, and for the next column designated as the "Amount deposited", the upper follower 154 controlling the upper computing head will still remain in adding sections, so that the number "12,345.67" will be added to the number "8,074.11", while the follower 155 still remains in the neutral sections, leaving the lower computing head inactive.

In passing to the first "Checked out" column, the carriage automatically moves the control 160 so that the follower 154 controlling the upper computing head passes through a switch section 204 into a series of neutral sections 205. At the same time, the lower follower 155 controlling the lower computing head passes through a switch section 206 into a series of adding sections 207, so that at this point the upper computing head will be rendered inactive while the lower computing head is starting to add. This continues until the series of columns designated as "Checked out" have been written.

All this time the amounts checked out have been added up in the lower computing head while the upper computing head remains neutral or inactive. The total amount checked out can be readily read off the lower computing head and is found to be "6,037.00". Before this is written by the typewriter, the upper follower 154 will have passed through a switch section 208 and into substracting sections 209, so that the upper computing head will be shifted from neutral to substracting. At the same time, the lower follower 155 which controls the lower computing head will have passed through a switch section 210 into subtracting sections 211. By this action, when "6,037.00" is struck by the typewriter, this amount will be subtracted in both the upper and lower computing heads giving the difference in the upper computing head between the sum of the balance carried forward and the amount deposited for the day and the total amount checked out for the day, which may be termed the "balance" to be carried forward for the next day, and at the same time bringing the lower computing head back to zero, by subtracting the sum previously added therein.

During the typewriting of the next column indicating the balance to be carried forward, the lower follower 155, which controls the lower computing head, will pass through a switch 212 into movable sections 213 so that the lower computing head will remain passive or inactive. The upper follower 154 however will continue in subtracting sections so that the balance "14,382.78" will be subtracted so that the upper computing head is brought back to zero, but if any mistake is made in copying the total from the computing head on the typewriter the computing head will not read zero at the end of the operation. Thus the computing head will prove the accuracy of copying the result from it.

The next day the account can be carried on in the same way by first writing the day, while the computing mechanism is inactive, then writing the balance carried forward from the previous day while the upper computing head is adding and the lower computing head is neutral, then writing the amount deposited for the day while the upper computing head is adding and the lower computing head is neutral, next writing the successive amounts checked out while the upper computing head is neutral and the lower computing head is adding, then writing the total amount checked out while both of the computing heads are subtracting, and finally writing the balance for the day while the lower computing head is neutral and the upper computing head is subtracting. It will thus be seen that both of the computing heads start at zero, and after having completed the desired operations are brought back to zero again through the automatic action of the control.

It will be seen that inasmuch as the operation is entirely mechanical, there is no danger of the operator making any mistake except from striking the wrong key, so that great accuracy may be obtained with complicated calculation involving addition and subtraction.

It will be further seen that the operator is relieved from an unnecessary amount of work, and can devote all his attention to the striking of the proper numeral key in carrying out the work desired.

Variations may be resorted to within the scope of the invention, and portions of the improvements may be used without others.

Having thus described my invention, I claim:

1. The combination with a plurality of stationary computing heads manually settable individually for adding, subtracting and remaining passive or neutral, and automatic means for controlling concomitantly all of said computing heads, so that some of said computing heads may perform one operation while others of said computing heads remain neutral or perform the opposite operation with the same set of figures.

2. The combination with a typewriting mechanism including a traveling carriage, of a manually controlled computing mechanism mounted upon the stationary framework of the machine, a control carried by said carriage for determining the state of the computing mechanism as to adding, subtracting or remaining passive, and connections upon the framework of the machine extending from said control to said computing mechanism.

3. The combination with a computing head of an automatic control for governing the change in action of said computing head as to adding, subtracting and remaining neutral, manual means for governing the change in action of said computing head as to adding, subtracting and remaining neutral and means for shifting the control from said manual means to said automatic control.

4. The combination with a stationary computing head having a rotatable traveling master wheel for controlling the operation of the same, of a tens-carrying mechanism for said computing head, and an automatic control operating to reverse said master wheel and said tens-carrying mechanism concomitantly.

5. The combination with a stationary computing head having a traveling master wheel of a clutch controlling the rotation and direction of rotation of said master wheel, and an automatic control for shifting said clutch.

6. The combination with a typewriting mechanism including a carriage, of a computing mechanism including a master wheel, a clutch controlling the rotation and direction of rotation of said master wheel, and an automatic control carried by said carriage for shifting said clutch.

7. The combination with a computing head having a master wheel, of a clutch controlling the rotation and direction of rotation of said master wheel, and an automatic control for shifting said clutch; said automatic control being adjustable to vary the sequence of movements of said clutch.

8. The combination with a computing head having a master wheel, of a clutch controlling the rotation and direction of rotation of said master wheel, and an automatic control for shifting said clutch; said automatic control being of a composite nature and comprising a plurality of sections adjustable to vary the sequence of movements of said clutch.

9. The combination with a computing head having a master wheel, of a clutch controlling the rotation and direction of rotation of said master wheel, and an automatic control for shifting said clutch; said automatic control being of a composite nature and comprising a plurality of interchangeable sections capable of varying the sequence of movements of said clutch.

10. The combination with a plurality of computing heads each having a master wheel of a clutch for each of said master wheels controlling the rotation and direction of rotation of said master wheels, controlling mechanism and means for manipulating said clutches simultaneously and separately to corresponding or different positions.

11. The combination with a plurality of computing heads each having a master wheel, of a clutch for each of said master wheels controlling the rotation and direction of rotation of said master wheels, controlling mechanism and means for manipulating said clutches simultaneously and separately to corresponding or different positions; tens carrying mechanism for each of said computing heads, and clutches for controlling the rotation and direction of rotation of said tens carrying mechanism, said controlling mechanism having means for manipulating said last-mentioned clutches concomitantly with said first-mentioned clutches.

12. The combination with a plurality of computing heads, of tens-carrying mechanism for each of said computing heads, clutches for controlling the rotation and direction of rotation of said tens carrying mechanism, and controlling mechanism having means for manipulating said clutches simultaneously and separately to corresponding or different positions.

13. The combination with a typewriting mechanism including a letter-feeding carriage, of computing mechanism comprising an element traveling with said carriage, carriage-controlled means for governing the character of computation carried on by said computing mechanism, and means controlling the connection of said governing means with said carriage to render the same operative or inoperative.

14. The combination with a typewriting mechanism including a letter-feeding carriage, of computing mechanism comprising an element traveling with said carriage, carriage-controlled means for governing the character of computation carried on by said computing mechanism, and a latch forming a detachable means for connecting said first-mentioned means with said carriage so as to govern the control of said first mentioned means by said carriage.

15. The combination with typewriting mechanism, of computing mechanism, keys for controlling the operation of said typewriting mechanism and said computing mechanism, a control for governing the character of computation by said computing mechanism, and means controlled by said control for determining the control of said computing mechanism by said keys.

16. The combination with typewriting mechanism, of computing mechanism, keys for controlling the operation of said typewriting mechanism and said computing mechanism, a control for governing the active and inactive periods of said computing mechanism, and means controlled by said control for determining the control of said computing mechanism by said keys.

17. The combination with typewriting mechanism, of computing mechanism, keys for controlling the operation of said typewriting mechanism and said computing mechanism, a control for governing the character of computation by said computing mechanism, and disconnecting means controlled by said control for operatively disconnecting said computing mechanism from said keys so as to render said computing mechanism inactive.

18. The combination with typewriting mechanism, of computing mechanism, keys for controlling the operation of said typewriting mechanism and said computing mechanism, a control for governing the active and inactive periods of said computing mechanism, and disconnecting means controlled by said control for operatively disconnecting said computing mechanism from said keys so as to render said computing mechanism inactive.

19. The combination with typewriting mechanism, of computing mechanism, keys for controlling the operation of said typewriting mechanism and said computing mechanism, and a controlling means independent of actuation by said computing mechanism and said keys, for disconnecting said computing mechanism from said keys; said controlling means having certain parts adjustable to vary the instant of disconnection of said computing mechanism from said keys.

20. The combination with typewriting mechanism, of computing mechanism, keys for controlling the operation of said typewriting mechanism and said computing mechanism, and a controlling means independent of actuation by said computing mechanism and said keys, for disconnecting said computing mechanism from said keys; said controlling means having certain parts interchangeable to vary the period of connection of said computing mechanism with said keys.

21. The combination with typewriting mechanism including numeral keys and also including a traveling carriage, of a computing mechanism, including an indexing mechanism, keys for controlling said computing mechanism as well as said typewriting mechanism, and a control movable concomitantly with said carriage, for disconnecting said computing mechanism from said keys and thereby preventing the operation of said indexing mechanism by the numeral keys of the typewriter.

22. The combination with typewriting mechanism including a traveling carriage, of a computing mechanism, keys for controlling said computing mechanism as well as said typewriting mechanism, a control movable concomitantly with said carriage for disconnecting said computing mechanism from said keys, and means for permitting the movement of said carriage while said control remains stationary so as to render said control inactive.

23. The combination with typewriting mechanism, of a plurality of keys for said typewriting mechanism, a computing head, controlling means for said computing head, hook links detachably connected to said keys and connected to said controlling means so that the operation of said keys may control the operation of said computing head through said controlling means, a shift bar connected to said links for connecting and disconnecting said links with said keys, a control for determining the character of computation of said computing head, and connections operable by said control for actuating said shift bar.

24. The combination with typewriting mechanism, of a plurality of keys for said typewriting mechanism, a computing head, controlling means for said computing head, hook links detachably connected to said keys and connected to said controlling means so that the operation of said keys may control the operation of said computing head through said controlling means, a shift bar connected to said links for connecting and disconnecting said links with said keys, a control for determining the character of computation of said computing head, said control having one or more cam lugs thereon, a lever adapted to be operated by said cam lugs, and connections between said lever and said shift bar, whereby the actuation of said lever will operate said shift bar to disconnect said keys from said computing mechanism.

25. The combination with typewriting mechanism, of a plurality of keys for said typewriting mechanism, a computing head, controlling means for said computing head, hook links detachably connected to said keys and connected to said controlling means so that the operation of said keys may control the operation of said computing head through said controlling means, a shift bar connected to said links for connecting and disconnecting said links with said keys, a control for determining the character of computation of said computing head, said control having one or more cam lugs thereon, a lever adapted to be operated by said cam lugs, connections between said lever and said shift bar, whereby the actuation of said lever will operate said shift bar to disconnect said keys from said computing mechanism, and spring means for returning said shift bar to connect said computing mechanism with said keys.

26. The combination with typewriting mechanism including a carriage, of keys for said typewriting mechanism, a computing head comprising computing wheels, a source of power for turning said wheels, connections between said computing head and said keys whereby the action of said computing head may be controlled from said keys, and means carried by said carriage for interrupting the connection between said computing head and said keys.

27. The combination with typewriting mechanism including a carriage, of keys for said typewriting mechanism, a computing head, connections between said computing head and said keys whereby the action of said computing head may be controlled from said keys, means carried by said carriage for interrupting the connection between said computing head and said keys, and spring means for completing the connection between said computing head and said keys after interruption by said means carried by said carriage.

28. The combination with typewriting mechanism including a carriage, of computing mechanism including a computing head, keys for controlling the action of both said computing mechanism and said typewriting mechanism, links detachably connected to said keys, a shift bar for shifting said links into and out of connection with said keys, means for connecting said links with said computing mechanism, a lever connected to said shift bar, a lever adapted to actuate said first-mentioned lever in one direction, a spring adapted to actuate said first-mentioned lever in another direction, a third lever connected to said second-mentioned lever, a roller on said first-mentioned lever, and a cam carried by said carriage adapted to manipulate said roller to actuate said shift bar.

29. The combination with typewriting mechanism, of computing mechanism operable concomitantly with said typewriting mechanism, and a control for governing the action of said computing mechanism, including a plurality of sections having tracks therein, said sections being adjustable to vary the relative positions of said tracks.

30. The combination with typewriting mechanism, of computing mechanism operable concomitantly with said typewriting mechanism, and a control for governing the action of said computing mechanism, including a plurality of sections having tracks therein; said sections being reversible to vary the relative positions of said tracks.

31. The combination with typewriting mechanism, of computing mechanism operable concomitantly with said typewriting mechanism, and a control for governing the action of said computing mechanism, including a plurality of sections having tracks therein; said sections being interchangeable to vary the relative position of said tracks and thus to vary the sequence of actions of said computing mechanism.

32. The combination with typewriting mechanism, of computing mechanism operable concomitantly with said typewriting mechanism, a control for governing the action of said computing mechanism, including a back plate, sections having tracks therein detachably connected to said back plate, and means for clamping said sections in position on said back plate.

33. The combination with typewriting mechanism, of computing mechanism operable concomitantly with said typewriting mechanism, a control for governing the action of said computing mechanism, including a back plate, sections having tracks therein detachably connected to said back plate, and spring actuated clamping means for securing said sections in position on said back plate.

34. The combination with typewriting mechanism, of computing mechanism operable concomitantly with said typewriting mechanism, a control for governing the action of said computing mechanism, including a back plate, a fixed rail on said back plate, a movable rail on said back plate, said fixed and said movable rails forming ways between them, and a plurality of interchangeable sections mounted in said ways.

35. The combination with typewriting mechanism, of computing mechanism operable concomitantly with said typewriting mechanism, a control for governing the action of said computing mechanism, including a back plate, a fixed rail on said back plate, a movable rail on said back plate, said fixed and said movable rails forming ways between them, a plurality of interchangeable sections mounted in said ways, and means for manipulating said movable rail.

36. The combination with typewriting mechanism, of computing mechanism operable concomitantly with said typewriting mechanism, a control for governing the action of said computing mechanism, including a back plate, a fixed rail on said back plate, a movable rail on said back plate, said fixed and said movable rails forming ways between them, a plurality of interchangeable sections mounted in said ways, a spring for actuating said movable rail to normally clamp said sections in position, and means for manipulating said movable rail against the tension of said spring.

37. The combination with typewriting mechanism, of computing mechanism operable concomitantly with said typewriting mechanism, a control for governing the action of said computing mechanism, including a back plate, a fixed rail on said back plate, a movable rail on said back plate, said fixed and said movable rails forming ways between them, a plurality of interchangeable sections mounted in said ways, a spring for actuating said movable rail to normally clamp said sections in position, means for manipulating said movable rail against the tension of said spring, and a movable chock for co-operating with said rails to hold said sections in position.

38. The combination with typewriting mechanism, of computing mechanism operable concomitantly with said typewriting mechanism, a control for governing the action of said computing mechanism, including a back plate, a fixed rail on said back plate, a movable rail on said back plate, said fixed and said movable rails forming ways between them, a plurality of interchangeable sections mounted in said ways, a spring for actuating said movable rail to normally clamp said sections in position, means for manipulating said movable rail against the tension of said spring, and a chock co-operating with said rails to hold said sections in position.

39. The combination with typewriting mechanism, of computing mechanism operable concomitantly with said typewriting mechanism, a control for governing the action of said computing mechanism, including a back plate, interchangeable sections having cam tracks therein, fixed and movable rails for securing said sections in position, and fixed and movable chocks co-operating with said rails to secure said sections in position.

40. The combination with typewriting mechanism, of computing mechanism operable concomitantly with said typewriting mechanism, a control for governing the action of said computing mechanism, including a back plate, interchangeable sections having cam tracks therein, fixed and movable rails for securing said sections in position, fixed and movable chocks co-operating with said rails to secure said sections in position, and means for manipulating certain of said chocks and rails.

41. The combination with typewriting mechanism, of computing mechanism operable concomitantly with said typewriting mechanism, a control for governing the action of said computing mechanism, including a back plate, fixed and movable rails on said back plate, fixed and movable chocks on said back plate, interchangeable sections secured between said rails and said chocks, springs for moving certain of said rails and said chocks in one direction to clamp said sections in position on said back plate, and means for moving certain of said rails and said chocks against the tension of said spring to permit the removal and adjustment of said sections.

42. The combination with a computing head including a master wheel, of mechanism for determining the rotation of said master wheel, a manually operable lever for controlling said mechanism, a link for operating said lever, an automatic control for operating said link, and means for connecting and disconnecting said link with said lever.

43. The combination with a computing head including a master wheel, of mechanism for determining the rotation of said master wheel, a manually operable lever for controlling said mechanism, a link for operating said lever, an automatic control for operating said link, means for connecting and disconnecting said link with said lever, a lock for locking said lever in any position of adjustment thereof, and means operable by said last-mentioned means for removing said lock from co-operative juxtaposition with said lever when said link is connected to said lever.

44. The combination with a computing head including a master wheel, of mechanism for determining the rotation of said master wheel, a shift lever for controlling said mechanism, a pin on said lever, a link having a slotted plate adapted to be connected to said lever through the intermediary of said pin, the slot in said plate being of such a character that in one position of said link said pin will connect said link with said lever, and in another position of said link said link will be free to move relative to said pin without operating said lever, shifting mechanism for varying the position of said link with respect to said pin, and means for manipulating said link.

45. The combination with a computing head including a master wheel, of mechanism for determining the rotation of said master wheel, a lever for controlling said mechanism, a pin on said lever, a link carrying a slotted plate engaging said pin, the slot in said plate being of such a character as to permit a relative motion of said link with respect to said lever in one position of adjustment of said link, and to form a positive connection between said link and said lever at another position of adjustment of said link, a bar for manipulating said link to the several positions of adjustment, a lever for actuating said bar, and means for operating said link to control the rotation of said master wheel.

46. The combination with a computing head including a master wheel, of mechanism for determining the rotation of said master wheel, a lever for controlling said mechanism, a pin on said lever, a link carrying a slotted plate engaging said pin, the slot in said plate being of such a character as to permit a relative motion of said link with respect to said lever in one position of adjustment of said link, and to form a positive connection between said link and said lever at another position of adjustment of said link, a bar for manipulating said link to the several positions of adjustment, a lever for actuating said bar, means for operating said link to control the rotation of said master wheel, a lock plate for securing said first-mentioned lever in several positions of adjustment, and means operated by said second-mentioned lever for removing said lock plate from co-operation with said second mentioned lever when said link is operatively connected with said first-mentioned lever.

47. The combination with a computing head including a master wheel, of mechanism for determining the rotation of said master wheel, a lever for controlling said mechanism, a pin on said lever, a link carrying a slotted plate engaging said pin, the slot in said plate being of such a character as to permit a relative motion of said link with respect to said lever in one position of adjustment of said link, and to form a positive connection between said link and said lever at another position of adjustment of said link, a bar for manipulating said link to the several positions of adjustment, a lever for actuating said bar, means for operating said link to control the rotation of said master wheel, a lock plate for securing said first-mentioned lever in several positions of adjustment, and means operated by said second-mentioned lever for removing said lock plate from co-operation with said second mentioned lever when said link is operatively connected with said first-mentioned lever; said last-mentioned means and said lock plate acting to lock said second-mentioned lever in either position of adjustment.

48. The combination with a plurality of computing heads each having a master wheel, of mechanism for determining the rotation of said master wheels, a typewriting mechanism including a carriage, a control carried by said carriage having individual portions for controlling said mechanism so as to determine the rotation of each of said master wheels, and connections between said control and said mechanism.

49. The combination with a plurality of computing heads, of a master wheel for each of said computing heads, controlling mechanism for each of said master wheels so as to determine the rotation thereof, a shifter lever for each of said controlling mechanisms, a link adapted to be operatively connected to each of said levers, shifting mechanism for simultaneously connecting all of said links with all of said levers, and automatic means for operating said links to determine the rotation of said master wheels.

50. The combination with a computing head including a master wheel, of mechanism for determining the rotation of said master wheel, a lever for controlling said mechanism, a link connectible to said lever so as to operate the same, means for operating said link, and a lever for shifting said link into and out of connection with said first-mentioned lever, and locking means for said second-mentioned lever.

51. In a combined typewriting and computing machine, the combination with numeral keys and a traveling carriage, of a plurality of gangs of computing wheels, a master wheel for each gang, means for connecting each master wheel to the numeral keys to be turned to an extent determined by the numeral key operated, means for automatically determining at various points in the travel of said carriage how each master wheel shall be connected to said keys, and means for independently totally disconnecting said keys from the computing mechanism.

52. In a combined typewriting and computing machine, the combination with numeral keys and computing wheels, of a traveling carriage, a master wheel for turning said computing wheels, means for connecting said numeral keys to said master wheel, a connection from said carriage for automatically disconnecting said keys from said wheel; said connection being so arranged that said keys may be separately manually disconnected.

53. In a combined typewriting and computing machine, the combination with numeral keys, of a plurality of stationary gangs of computing wheels, a traveling master wheel for each gang for turning the wheels to an extent determined by the numeral key operated, a stationary source of power for so turning said wheel, a clutch intermediate each master wheel and source of power, and means for automatically setting said clutches by the movement of the carriage.

54. In a combined typewriting and computing machine, the combination with a slide, of a three-toothed detent plate swung to inoperative position by said slide, and a cam on said slide for detaining said slide in its shifted position.

55. In a combined typewriting and computing machine, the combination with numeral keys, a plurality of gangs of computing wheels, of a master wheel for each of said gangs, a source of power for turning said wheels by a single shaft, a clutch intermediate said shaft and each master wheel, manual means for separately setting said clutches to alter the relation of the shaft and the master wheel, means for automatically separately setting said clutches, and a single slide for disconnecting said automatic setting from said clutches.

56. In a combined typewriting and computing machine, the combination with a traveling carriage, of computing wheels, a master wheel for turning said computing wheels to an extent determined by said keys, means tending to couple said keys to said master wheel, and a control traveling with said carriage for positively breaking said connection.

57. In a combined typewriting and computing machine, the combination with numeral keys and computing wheels, of a master wheel for engaging said wheels seriatim to turn them to an extent determined by the numeral keys, a clutch intermediate said keys and wheels for determining what effect said keys shall have on said wheels, means for moving said clutch to a neutral position in which said keys will turn said master wheel, and a separate means for totally disconnecting said keys from said computing mechanism.

58. In a combined typewriting and computing machine, the combination with numeral keys and computing wheels, of means for making said keys inoperative on said wheels, and another means for making said keys inoperative on said computing mechanism.

59. In a computing machine, the combination with a traveling carriage, of mechanism, including a three-toothed detent plate, for controlling said computing mechanism, said controlling mechanism also including means for moving said plate by travel of said carriage.

60. In a combined typewriting and computing machine, the combination with numeral keys and computing wheels, of a traveling carriage, a tabulating device for positioning said carriage, a rack forming part of said tabulating device, means controlled by said carriage for varying the connection between said keys and wheels, and means for locking said controlling means to said rack to travel therewith.

61. In a combined typewriting and computing machine, the combination with numeral keys and computing wheels, including wheels mounted on the stationary framework of the machine, of a traveling carriage for said typewriter, a separate carriage for said computing machine, means on said computing machine carriage for varying the relation of said keys and wheels on said stationary framework, means for positioning said typewriter carriage by tabular keys, a rack, and means for causing said computing machine carriage to travel with said typewriter carriage.

62. In a combined typewriting and computing machine, the combination with numeral keys and a plurality of gangs of computing wheels, of a tabulating device comprising a rack bar for positioning said typewriter carriage, a traveling device for automatically varying the connection between said keys and each gang of computing wheels separately, and a latch to engage said rack for causing said traveling computing device to travel with said typewriter carriage.

63. In a combined typewriting and computing machine, the combination with a traveling carriage and a plurality of gangs of computing wheels, of a master wheel for each of said gangs, said gangs and said master wheels each forming relatively movable elements, a tabulating mechanism for said typewriter, means for connecting identical elements to said carriage by a member of said tabulating mechanism so that they move concomitantly, and independent means governed by the position of said carriage for determining how each master wheel shall be affected by the numeral keys.

64. In a combined typewriting and computing machine, the combination with a traveling carriage, numeral keys and a gang of computing wheels, of means for connecting said computing mechanism to said carriage so that it automatically does crossadding, and means settable for different columns individully to be controlled by the travel of said carriage, for determining whether said computing wheels shall add, subtract or be neutral.

65. In a computing machine, a three-toothed detent plate whereby the computing mechanism is alined when manually operated, moved by the traveling carriage whereby when said computing mechanism is automatically controlled the detent plate is ineffective.

66. In a computing machine, two independent handles for controlling the connections to the totalizers, and a cam plate whereby a detent plate is caused to aline said handles when said handles are used to control the connections to the totalizers, and is moved to ineffective position when the connections are manually controlled.

67. The combination with a typewriting mechanism; of computing mechanism operable concomitantly with said typewriting mechanism; a typewriter carriage; a bar moving therewith; and a control for said computing mechanism, said control including a plurality of cam sections mounted on said bar, and a follower cooperating with said cam sections.

68. The combination with a typewriting mechanism; of computing mechanism operable concomitantly with said typewriting mechanism; a typewriter carriage; a bar moving therewith; and a control for said computing mechanism, said control including a plurality of adjustable cam sections mounted on said bar and a follower cooperating with said adjustable cam sections.

69. In a calculating machine the combination of: a set of digit keys; a traveling carriage; a computing device; a master wheel adapted to insert numbers seriatim in said computing device upon the operation of said digit keys; an escapement for said carriage also operated by said digit keys; a bar on said carriage; a plurality of cams adjustably mounted on said bar; a follower cooperating with said adjustable cams; and a gear shift device for said master wheel controlled by said follower whereby the action of said digit keys on said master wheel during the travel of the carriage may be predetermined.

70. The combination with a plurality of totalizers, of a traveling carriage, individual state-controlling mechanisms extending from said totalizers to said carriage and controlled from said carriage, and a master control dominating said individual control mechanisms.

71. The combination with a computing head, of a controlling mechanism for governing the state of said computing head, a movably-mounted plate, a series of locators detachably mounted on said plate in a straight line with each other, and an elongated guard-bar mounted on said plate and engaging said locators to hold them in position on said plate, said plate moving said locators to bring them successively into cooperation with said controlling mechanism, to govern the state of said computing head.

72. The combination with a computing head, of a controlling mechanism for governing the state of said computing head, a shifter for manipulating said controlling mechanism, said shifter including a plurality of locators, and a pivotally-mounted guard-bar for holding said locators in place.

73. The combination with a computing head, of a shifter for controlling the state of said computing head, said shifter including a series of locators arranged end to end in a straight line, and a spring-pressed elongated guard for holding said locators in their position of alignment.

WALTER WRIGHT.

Witnesses:
K. FRANKFORT,
B. GOLDBERG.